(12) United States Patent
Davis

(10) Patent No.: US 10,455,774 B2
(45) Date of Patent: Oct. 29, 2019

(54) HAND-HELD MINIATURE AUTOMATIC TREE INJECTION DEVICE

(71) Applicant: Russell Davis, Lynnfield, MA (US)

(72) Inventor: Russell Davis, Lynnfield, MA (US)

(73) Assignee: Arborjet, Inc., Woburn, MA (US)

( * ) Notice: Subject to any disclaimer, the term of this patent is extended or adjusted under 35 U.S.C. 154(b) by 0 days.

(21) Appl. No.: 16/127,848

(22) Filed: Sep. 11, 2018

(65) Prior Publication Data

US 2019/0037777 A1 Feb. 7, 2019

Related U.S. Application Data

(63) Continuation of application No. 14/730,559, filed on Jun. 4, 2015, now abandoned.

(60) Provisional application No. 62/007,526, filed on Jun. 4, 2014.

(51) Int. Cl.
*A01G 7/06* (2006.01)

(52) U.S. Cl.
CPC ..................... *A01G 7/06* (2013.01)

(58) Field of Classification Search
CPC ............ A01G 7/06; A01G 7/00; A01G 1/001
See application file for complete search history.

(56) References Cited

U.S. PATENT DOCUMENTS

| 3,783,804 | A | | 1/1974 | Platz | |
|---|---|---|---|---|---|
| 3,886,874 | A | | 6/1975 | Platz | |
| 4,011,685 | A | * | 3/1977 | Boyd | A01C 21/00 |
| | | | | | 422/501 |
| 4,112,617 | A | * | 9/1978 | Purviance | A01G 7/06 |
| | | | | | 118/408 |
| 4,596,088 | A | | 6/1986 | Graber | |
| 5,239,773 | A | | 8/1993 | Doolittle | |
| 5,797,215 | A | | 8/1998 | Doolittle | |
| 8,573,322 | B2 | | 11/2013 | Nagasaka | |
| 8,726,567 | B1 | | 5/2014 | Pishdadian | |
| 2001/0038804 | A1 | | 11/2001 | Norton | |
| 2004/0079169 | A1 | | 4/2004 | Wild | |
| 2013/0326944 | A1 | * | 12/2013 | Obrist | A01G 7/06 |
| | | | | | 47/57.5 |

FOREIGN PATENT DOCUMENTS

| CN | 2083407 U | 8/1991 |
|---|---|---|
| WO | WO 2004/004443 A2 | 1/2004 |

* cited by examiner

*Primary Examiner* — Magdalena Topolski
(74) *Attorney, Agent, or Firm* — Patent GC; Naomi S. Biswas

(57) ABSTRACT

A method of using a hand-held miniature device for injecting an agent into a tree with continuous pressure that is adjustable. The device features one-thumb on/off switch operation for a metered dose, precise dose measuring, and air-powered injection in a lightweight device. The on/off switch does not need to be held in the on position by a user.

6 Claims, 3 Drawing Sheets

HAND-HELD MINIATURE AUTOMATIC TREE INJECTION DEVICE

CROSS-REFERENCE TO RELATED APPLICATIONS

This application is a continuation of co-pending U.S. application Ser. No. 14/730,559, filed on Jun. 4, 2015, which claims priority from U.S. Provisional Application No. 62/007,526, filed on Jun. 4, 2014, and which are herein incorporated by reference.

FIELD OF THE INVENTION

The invention herein resides in the field of devices for injecting fluids into a tree and more particularly relates to a hand-held miniature device for injecting an agent into a tree with variable but continuous pressure that is adjustable.

BACKGROUND OF THE INVENTION

Tree injection devices typically are used to inject various agents, such as growth retardants or regulators, fertilizers, fungicides, insecticides, herbicides, pesticides and the like into the trunk of a tree. Ideally the injection is into the xylem cells of the outer grown rings of the tree. Most tree injection devices are manually operated and all of them are large and bulky.

Tree injection devices often operate under constant pressures and typically are available in two styles: low pressure tree injection devices that operate at a constant pressure of 2 psi-60 psi or less and high pressure tree injection devices that operate at a constant pressure of about 200 psi.

There is still a need in the art for a tree injection device in which the automatic injection device is light weight and easy to operate. The present invention is directed to these, as well as other, important ends.

SUMMARY OF THE INVENTION

It is an object of the invention to provide a hand-held miniature automatic device for injecting an agent into a tree with continuous pressure adjusted by the applicator.

In one embodiment of the invention the hand-held miniature automatic device 20 comprises an air cylinder 22 that automatically injects the agent into the tree when the cylinder 22 is activated by a switch 11. The device 20 also includes a dose adjustment and locking system 5 on the rear. The device 20 uses a clear metering barrel 13 (which can be made out of glass, pyrex or other clear material) to identify the dose applied and uses one way check valves 11, 14 to allow for loading and discharging the device. The air flow control valve 8 may be used to shut the system down while activated. By slowly opening the valve 8, the user is able to bleed out any trapped air and prime the system. Additionally, the device 20 fits in the palm of the user's hand and weighs around two pounds. In preferred embodiments, the device 20 weighs between about 1-4 pounds, more preferably between about 1.5-2.5 pounds, and most preferably about 2 pounds.

These same objectives may be achieved by making the air cylinder 19 and body 1 slightly larger requiring lower air pressure or by making the air cylinder 19 and body 1 slightly smaller where similar or higher air pressure may be required. The weight will adjust accordingly. This same device 20 could also be made from a composite material with lower weight, including but not limited to, plastics, thermoplastics, acetal resins, e.g., Delrin, and phenolic resins.

DETAILED DESCRIPTION OF THE PREFERRED EMBODIMENT(S)

As used throughout the disclosure, the following terms, unless otherwise indicated, shall be understood to have the following meanings.

"Agent" includes, but is not limited to, any liquid that is injected into a tree, such as, for example, fungicides, insecticides, herbicides, pesticides, growth retardants or regulators, fertilizers, nutrients, bacteriacides, flavors and other tree health products and the like, or a combination of two or more thereof.

"Tree" refers to any plant belonging to the kingdom Plantae, including, but not limited to, a tree, a woody tree, a plant, a woody plant, a bush, a vine, and the like.

Figure 1:
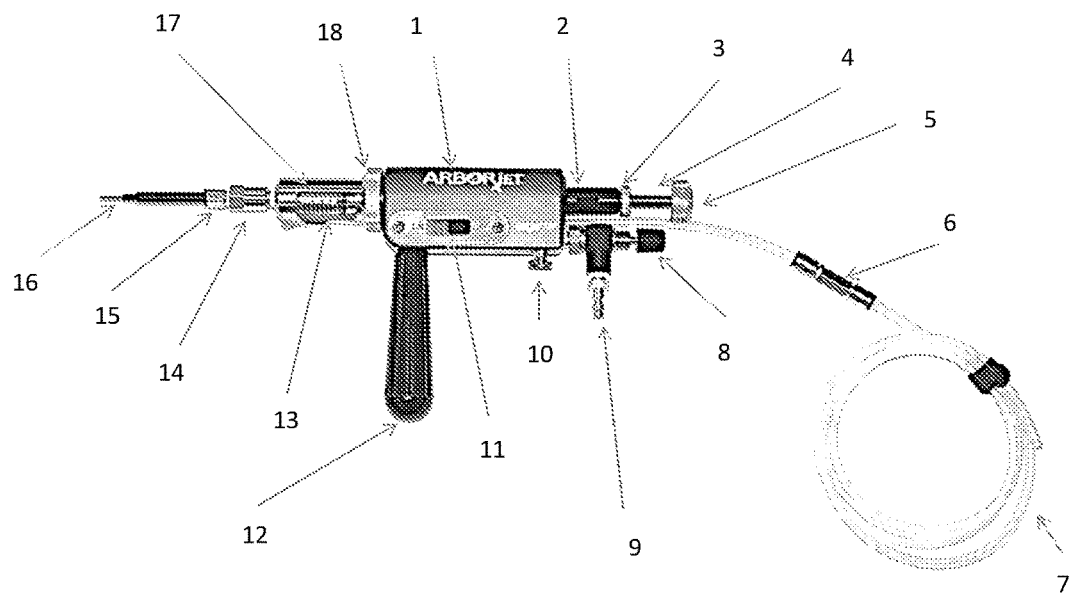
FIG. 1 illustrates a view of the hand-held miniature automatic device of this invention.
Figure 3:
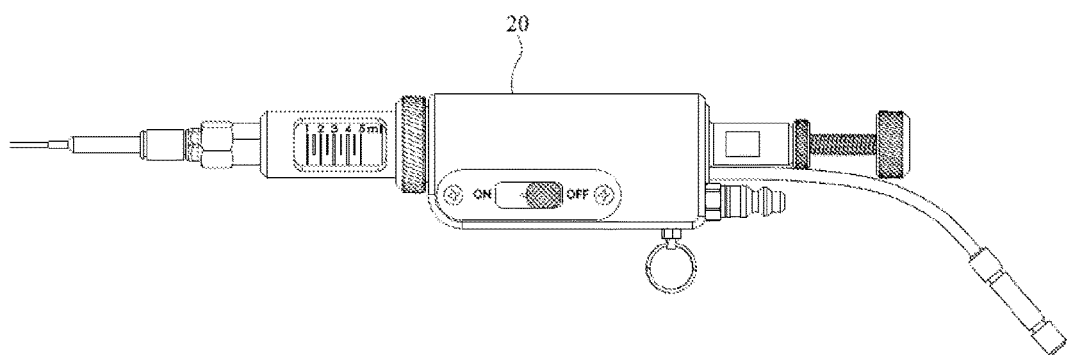
FIG. 3 illustrates a view of the hand-held miniature automatic device with a conical shape needle

As shown in FIG. 1, one embodiment of hand-held miniature automatic tree injection device 20 comprises a clear barrel 13, possibly glass or pyrex or other clear material, intake 6 and exit 14 check valves, air supply quick disconnect 9, a flow control valve 8 (which may also be eliminated if desired see FIG. 3), an adjustment piston rod 4 and lock nut 3 assembly, a mounting ring 10, a body 1, a removable handle 12, and an on/off switch 11 for activation.

Figure 2:
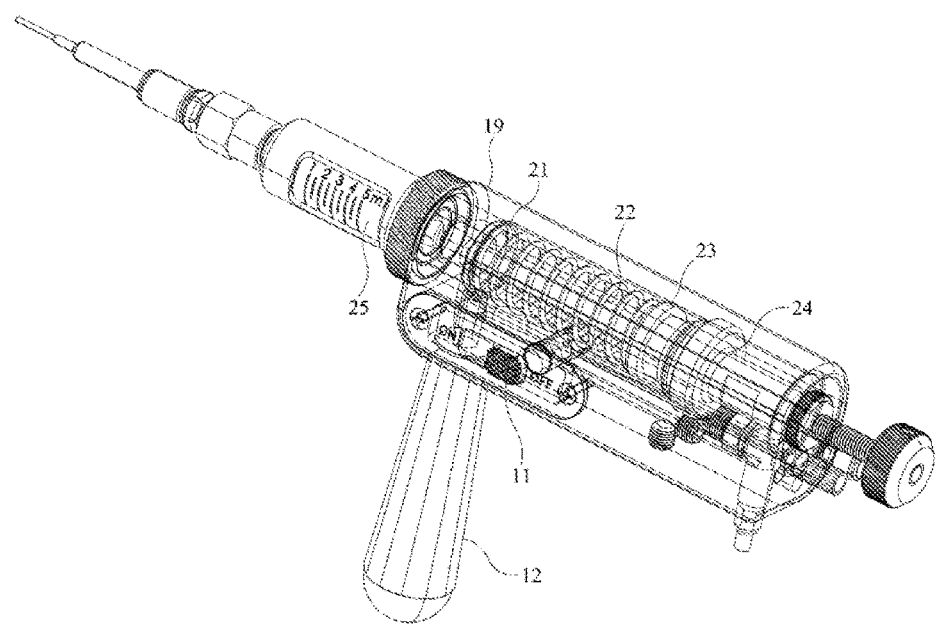
FIG. 2 illustrates an enlarged cross-sectional view of the hand-held miniature automatic device

As shown in FIG. 2, one embodiment of the hand-held miniature automatic tree injection device 20 comprises an air cylinder 19 housing an air piston 22 and o' ring air piston assembly 23, a fluid piston and o' ring assembly 25 and a stopper with o' ring assembly 24.

Figure 4:
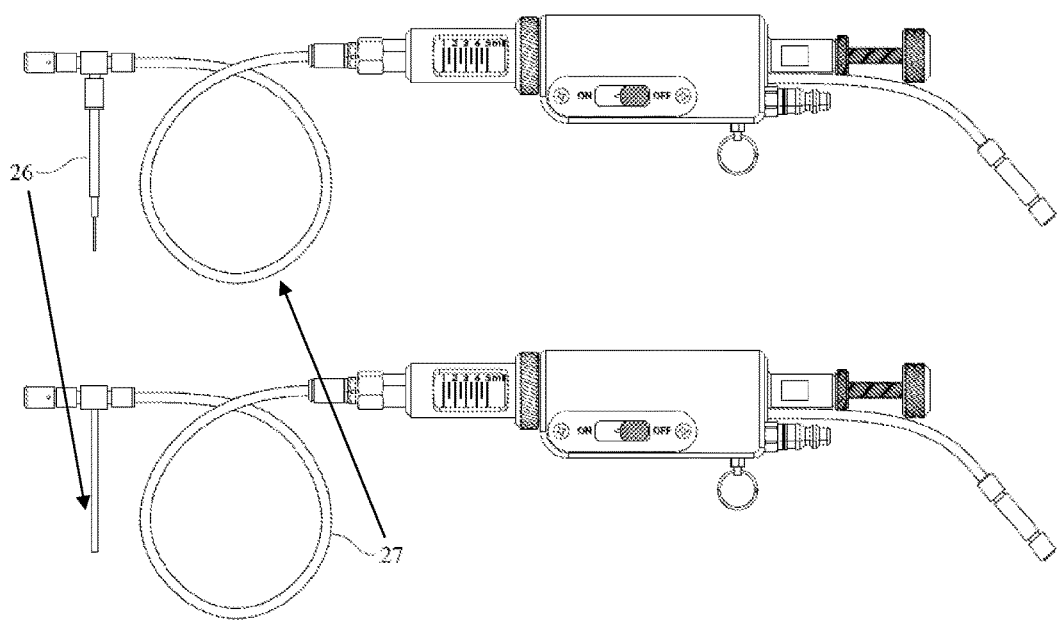
FIG. 4 illustrates a view of the hand-held miniature automatic device with a flexible tube that could use any needle design
Figure 5:
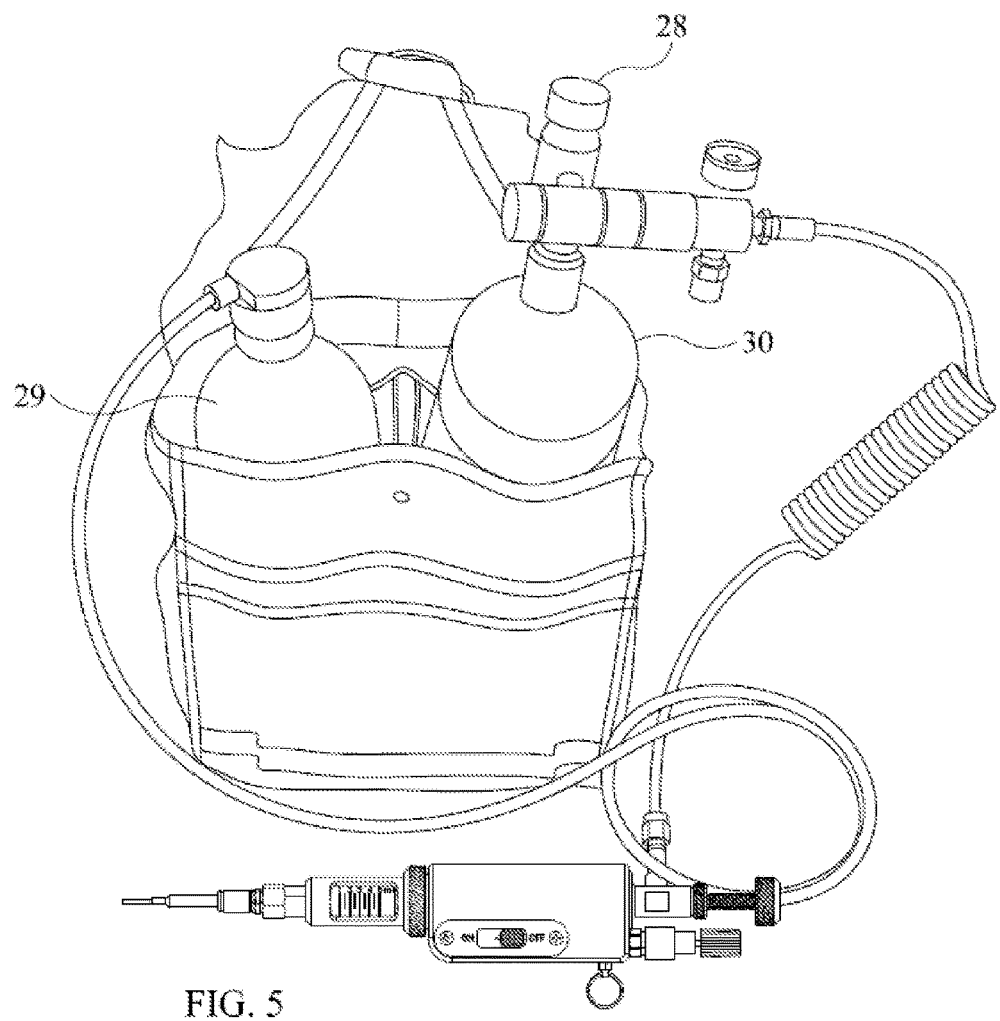
FIG. 5 illustrates a view of the hand-held miniature automatic device as a system

In one embodiment of the invention, a vacuum is created in the fluid piston chamber 25 automatically upon return of the air and fluid pistons. The underside intake check valve 6, upon return of the fluid piston 25, allows the liquid formulation to pass from the reservoir 29 to the fluid piston chamber 25 while substantially preventing the liquid formulation from passing from the piston chamber 25 to the reservoir 29. The adjustment shaft and stud stopper 24 identify the reset position and define the range of motion of the piston within the cylinder. The injector check valve 14 is connected to the case cylinder (glass barrel housing) 17 that encapsulates the clear barrel 13. This valve 14 has an attachment (PCT fitting) 15 that allows multiple tips 26 and or/flexible hose 27, (FIG. 3 and FIG. 4) to be used. The tip 26 at the end of the hand-held miniature automatic tree injection device or flexible hose 27 is equipped with a needle 16 that is inserted into the tree directly, using a conical shaped needle or through a plug. The injector check valve 14 allows the liquid formulation to pass from the piston chamber 25 to the needle 16 while substantially preventing the liquid formulation from passing from the needle 16 to the piston chamber 25. It should be noted that injection needles, hoses and plugs are well-known in the art and are not illustrated herein During the forward injection movement, the injection check valve 14 is in a closed position. Upon activating the on/off switch 11 forward to the on position, the fluid is injected into the tree as the injection check valve 14 opens with pressure and conversely the intake check valve 6 closes. After the metered amount of the agent is injected, a reverse movement of the on/off switch 11 to the off position will automatically return the air 22 and liquid pistons 25 and create a small vacuum in the liquid piston chamber 25 to the prescribed dose and the process is ready to start again. This may also be accomplished using a trigger that requires the switch to be held in the on position until the dose is applied. By timing the injection period and monitoring environmental conditions, various assumptions and decisions can be made concerning the tree's health. Adjustments can be made that optimize the applicator's goals concerning application speed, tree health or other factors.

One embodiment of the operation of the device includes a removable pressurized air tank 30 and pressure regulator 28 that adjusts the air cylinder 30 pressure from about 0 psi-125 psi, or higher in other embodiments. The air cylinder generates approximately a 2:1 advantage allowing tree intake pressures from about 0 psi-250 psi. This could also be provided by a compressor or other air holding device. Other power advantage ratios may also be used in similar, smaller, and larger embodiments of the design. These ratios of air piston pressure:liquid piston pressure may be selected from the range of 2:1-10:1 and the range of 1:2-1:10. In one embodiment, the air piston 22 provides a 2:1 pressure advantage to the liquid piston 25. The air cylinder and spring 21 also act as a cushion should the tree reject the speed, viscosity and pressure of the injected agent, allowing the tree to consume the agent at a rate it accepts.

In another embodiment of the operation of the device, the air flow regulator 28 will control the speed of the device and allow for priming. By adjusting the flow control valve 8 the speed has infinite variability; this assists with loading of various viscosities and reduces shock to the tree. Additionally, by closing the flow control valve 8 while in the off position and then by slowly opening the valve 8 in the on position, the pistons will move at a very slow speed so the user is able to bleed out any trapped air and prime the system. Alternatively, the same bleeding condition can be achieved by threading the adjustment screw forward until the air is removed.

In another embodiment of the operation of the device, the hand assembly fits directly in the user's palm at a weight of only about two pounds. It can be immediately adjusted by loosening the lock nut 3 and turning the adjustment knob 5. No measuring is necessary.

While the invention has been particularly shown and described with reference to certain embodiments, it will be understood by those skilled in the art that various changes in form and detail may be made without departing from the spirit and scope of the invention. The scope of the present invention should, therefore, be determined by the following claims.

I claim:

1. A method for injecting an agent into a tree for use by a user, the method comprising the following steps:
    (a) providing a portable hand-holdable tree injection device capable of delivering a variable but continuous injection of a pre-chosen agent at different injection pressures into the tree's trunk, wherein the device is powered by a portable air tank or regulator, the device weighs between 1-4 pounds, and the device comprises a clear metering barrel, an air piston, a flow control valve, an injector check valve, a needle at the end of the device, and an on/off switch;
    (b) adjusting the dose of the agent to be injected into the tree by using the clear metering barrel to identify the dose to be applied;
    (c) adjusting the air pressure to be between about 1 psi-125 psi;
    (d) inserting the needle into the tree;
    (e) turning the on/off switch to the on position, and then releasing the switch, such that the user is not required to hold the on/off switch in the on position throughout injection, wherein turning the on/off switch to the on position opens the injector check valve to allow the agent to be injected into the tree;
    (f) thereby injecting the tree with the agent.

2. The method of claim 1, wherein the agent is selected from the group consisting of fungicides, insecticides, herbicides, pesticides, growth retardants, regulators, fertilizers, nutrients, bacteriacides, flavors, or a combination of two or more thereof.

3. The method of claim 1, wherein the dose is adjusted in step (b) by the user visually watching the clear barrel while using an adjustment nut to move the air piston back and forth and locking it in place.

4. The method of claim 1, wherein a flow control valve is placed on the air tank to allow for variability of piston speed, and further wherein the flow control valve assists with loading of various viscosities and reducing shock to the tree.

5. The method of claim 1, wherein the user holds the device and switches it on with one hand.

6. The method of claim 1, wherein the device further comprises a ring, wherein the ring allows the device to be attached to the user's waist.

* * * * *